UNITED STATES PATENT OFFICE.

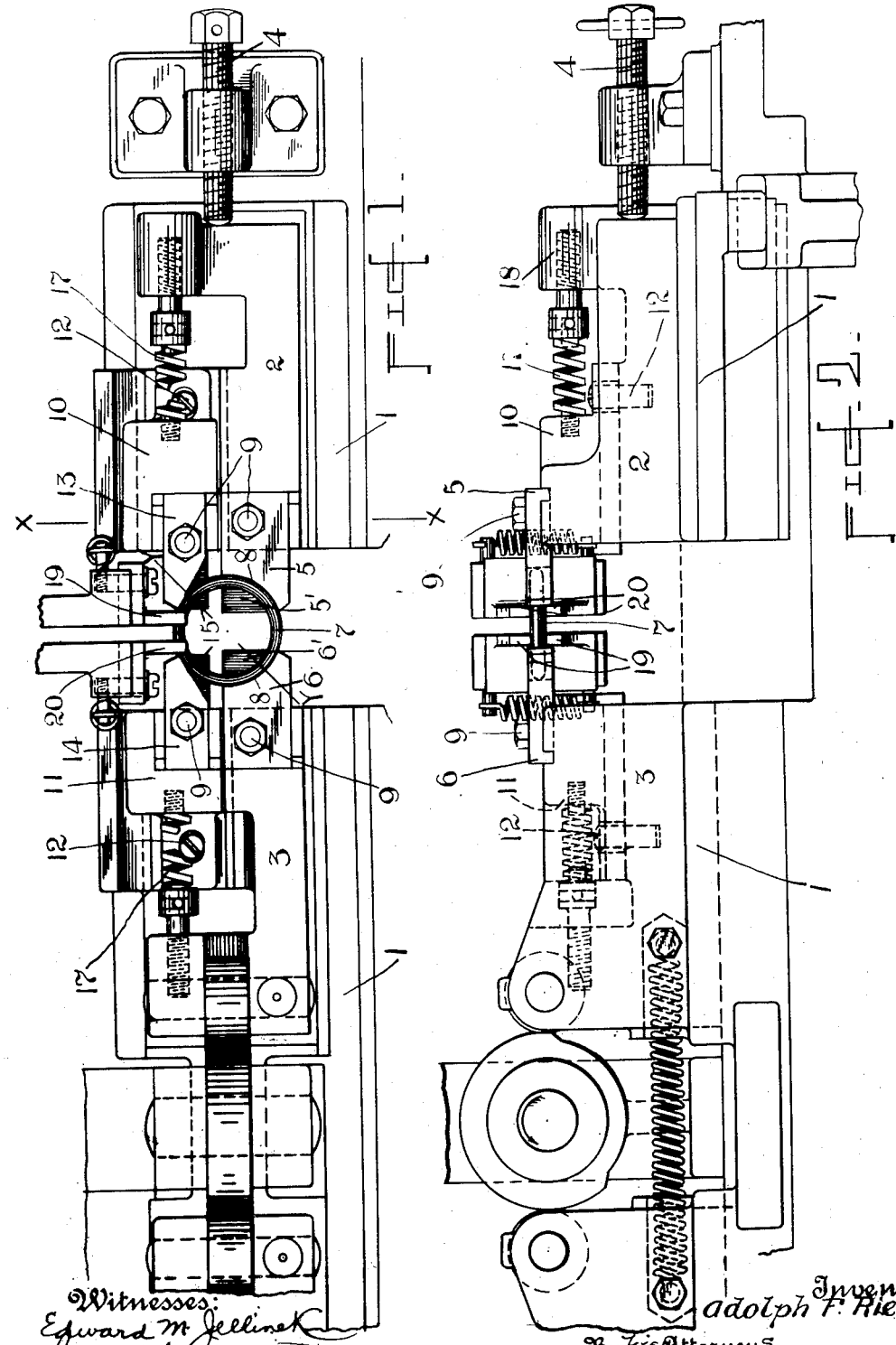

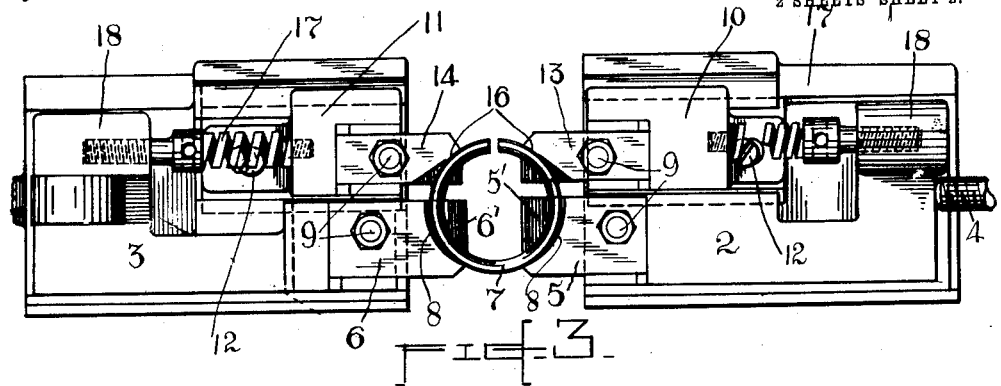
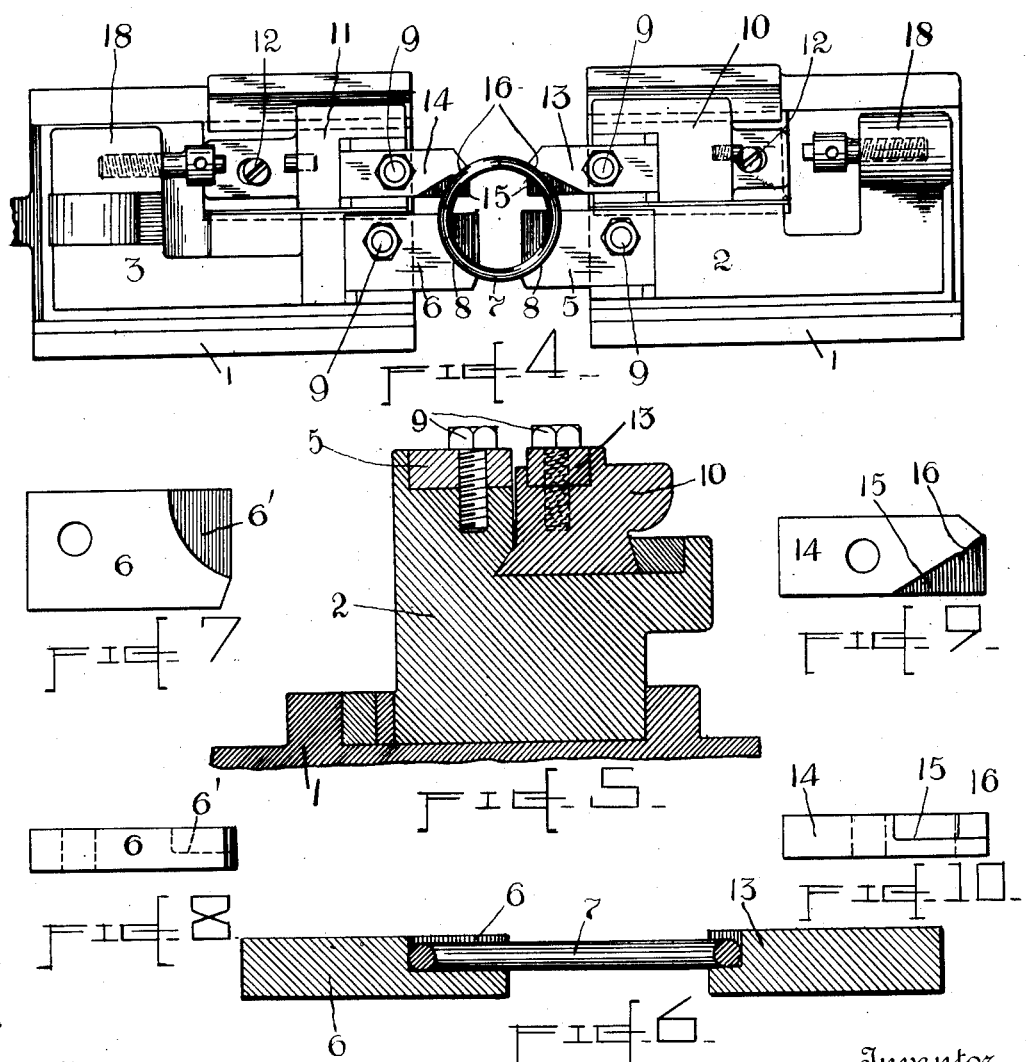

ADOLPH F. RIETZEL, OF CHARLESTOWN, RHODE ISLAND, ASSIGNOR TO THOMSON ELECTRIC WELDING COMPANY, OF LYNN, MASSACHUSETTS, A CORPORATION OF MASSACHUSETTS.

PRESSURE DEVICE FOR ELECTRIC METAL-WORKING APPARATUS.

1,048,884.  Specification of Letters Patent.  Patented Dec. 31, 1912.

Application filed March 14, 1910. Serial No. 549,207.

*To all whom it may concern:*

Be it known that I, ADOLPH F. RIETZEL, a citizen of the United States, and a resident of Charlestown, in the county of Washington and State of Rhode Island, have invented certain new and useful Improvements in Pressure Devices for Electric Metal-Working Apparatus, of which the following is a specification.

My present invention relates to electric metal working apparatus and more particularly to pressure devices for that type of such apparatus wherein a current of electricity is employed to soften the work at the desired location and pressure applied to effect a weld or otherwise work the metal.

My present invention is particularly useful when employed in apparatus designed for welding or uniting the free ends of a ring together but other uses to which the invention might be put will be readily understood by those skilled in the art by reading the subjoined description, and my invention will be described as carried into effect in a machine of this character; but it will be understood that it is not limited to this use as it might be employed for various other uses without departing from the spirit of the invention.

The object of my invention is to provide means for applying the necessary upsetting pressure to rings or other similar sections of metal to be welded or otherwise worked upon the softening of the same due to the passage of a heating current of electricity whereby the ring will not become distorted or out of true owing to this application of pressure.

Heretofore, it has been customary in welding rings to apply the welding pressure by means of the work-holders which support the work by engaging opposite sides of the ring. By these means the pressure is applied over the entire sides and as the work softens and yields, the work-holders push up and upset the work, the result being a flattening or distortion of the finished ring. This occasions an additional operation to true up the ring in cases where a perfect ring or circle is desired. When operating on rings of a small gage metal the distortion is not so apparent as the work has to be upset very little, but where heavy rings are worked, the upsetting is greater and the distortion consequently increases.

By practising my invention, the work-holders supporting the work bring the free ends in contact and separate pressure devices are provided which apply pressure to the heated section only in line therewith.

The invention consists in the combination in a ring welding machine of work-holders and separate pressure devices which apply pressure upon the softening of the work substantially only in line with the weld.

The invention also consists in the combinations of parts and details of construction hereinafter more particularly described and then specified in the claims.

In the accompanying drawings, Figure 1 is a plan of a part of an electric welding machine having my invention applied thereto. Fig. 2 is a front elevation of the same. Fig. 3 is a plan of the work-holders and pressure devices with the work inserted therein. Fig. 4 is a similar view after the ends of the ring have been forced together. Fig. 5 is an enlarged transverse section taken on the line X X Fig. 1. Fig. 6 is an enlarged section taken on the line Y Y Fig. 1. Figs. 7 and 8 are plan and elevation respectively of one work-holder detached from the rest of the apparatus. Figs. 9 and 10 are plan and elevation respectively of the pressure jaw detached from the apparatus.

Referring to the drawings, 1 indicates the table or platform of the machine upon which the various parts are mounted and supported.

2 and 3 indicate slides or work-holder bases suitably mounted in guides secured to the table 1, either or both of which may be movable to and away from each other by any suitable and well-known means as will be readily understood by those skilled in the electric metal working art. Preferably the slide 2 is fixed but capable of longitudinal adjustment by means of adjusting screw 4 and the slide 3 movable to and away from the slide 2 by any well-known means.

5 and 6 indicate the two work-holders carried by and suitably secured to the bases or slides 2, 3 respectively. These work-holders are preferably recessed to form a depository or ledge 5' and 6' within or upon which the work, indicated at 7, is supported. The curvature of the walls 8 of the recessed portions of the work-holders which grip and hold the ring is made the exact size and curve of the outer periphery of the finished ring so that after the ring is upset upon the softening of the metal it will coincide with the walls 8 which in a manner determine the size of the finished ring. To allow for different sized or shaped rings, the work-holders 5, 6 are readily detachable from their bases by removing nuts 9 so as to be replaced by others of different shaped recesses or parts which grip the work.

10 and 11 indicate sliding blocks mounted to slide in suitable guides formed on the bases or slides 2, 3. The said blocks 10 and 11 are free to slide longitudinally on the bases 2, 3 independent of the movement of said bases, the movement thereof being limited in either direction by a pin 12 secured to the base working in a slot formed in the supplementary slide. These slides 10 and 11 provide the necessary upsetting pressure and are each provided with a work-engaging jaw 13, 14 respectively. These jaws engage the periphery of the rim at either side of the weld or section of metal to be heated, the end of each jaw being recessed as at 15 and provided with a work-engaging face 16 which engages and presses against the periphery of the ring substantially in a longitudinal line with the section to be welded.

Springs 17 compressed between the ends of the slides 10 and 11 and a fixed boss 18 rising from the bases 2, 3 preferably form the source of welding or upsetting pressure which is transmitted to the work through the jaws 13 and 14. The said jaws are also preferably replaceable to handle different forms of metal to be worked.

The heating electric current may be applied to the work in any desired manner as for instance through a pair of contact jaws 19, 20 connected with the source of current and adapted to close upon the work on either side of the section to be welded and between the pressure jaws 13, 14. Electric current is supplied to the contacts 19, 20 in any suitable manner, all as well-known to those skilled in the electric metal working art and as the particular manner of supplying current forms no part of my present invention, further description will be dispensed with.

In the operation of the apparatus the ring 7 is placed in the recesses of the work-holders 5, 6 and also rests in the recesses of the pressure jaws 13 and 14. The work-holder base or slide 3 is then forced toward its companion slide 2 which butts the free ends of the ring against each other. As the ring is somewhat larger in diameter in this stage than when finished, the pressure jaws 13, 14 are forced backward and the springs 17 further compressed. After the heating current is permitted to flow through the work and the work softens, the jaws 13 and 14 are pushed forward by the springs 17 and the metal at the point of weld upset and finally welded together due to the pressure of the said jaws, the work-engaging faces 16 of the pressure jaws sliding on the periphery of the ring and applying the pressure substantially in a line with the weld whereby distortion of the ring is avoided, which distortion would take place were a general endwise pressure applied to the entire ring.

It will be understood that my invention is not limited to the various details and arrangements shown and described but various departures therefrom might be employed without departing from the spirit of this invention as set forth and contemplated in the appended claims.

What I claim as my invention is:

1. In an electric metal working apparatus, the combination of work-holders for supporting and gripping the work and independently movable pressure devices carried by said work-holders and adapted to apply welding pressure to the work in line with the softened part thereof.

2. In an electric metal working apparatus, the combination of work-holders for supporting and gripping the work and spring-actuated pressure devices carried by said work-holders and adapted to apply welding pressure to the work only in line with the desired weld.

3. In an electric metal working apparatus, the combination of work-holders movable toward and away from each other and pressure jaws movable in guides on said work-holders and adapted to apply upsetting pressure to the work in line with the weld.

4. In an electric metal working apparatus, the combination of work-holders movable toward and away from each other and spring-actuated pressure jaws carried by said work-holders and independently movable thereon to apply upsetting pressure as the work softens.

5. In an electric metal working apparatus, the combination of work-holders movable toward and away from each other, pressure jaws adapted to engage the work substantially in line with the weld and movable independent of said work-holders and springs for forcing said jaws forward independent of the workholders to apply welding or upsetting pressure as the work softens.

6. In a ring welding machine, the combination of work-holders adapted to support and grip the ring, pressure jaws adapted to engage the periphery of the ring substantially in line with the weld and movable toward each other independent of the work-holders and springs for applying welding or upsetting pressure to said jaws independent of the movement of the workholders.

7. In a ring welding machine, the combination of work-holders adapted to support the ring to be welded in a horizontal plane and independently movable pressure devices adapted to apply pressure to said ring only in a longitudinal line with the weld.

8. In a ring welding machine, the combination of work-holders adapted to engage and support the ring in a horizontal plane and independently movable pressure jaws adapted to grip said ring substantially in longitudinal line with the desired weld.

9. In an electric metal working apparatus, the combination of work-holders movable toward and away from each other and pressure devices movable toward and away from each other with said work-holders and also movable toward and away from each other independent of said work-holders to apply the welding or upsetting pressure to the work.

Signed at Stonington in the county of New London and State of Conn.

ADOLPH F. RIETZEL.

Witnesses:
M. NETTIE MARTIN,
ROSE H. RIETZEL.